June 28, 1966     W. R. MARTINI     3,258,616
PORTABLE THERMIONIC POWER SOURCE

Filed Nov. 30, 1962     2 Sheets-Sheet 2

INVENTOR.
WILLIAM R. MARTINI
BY
ATTORNEY

United States Patent Office 3,258,616
Patented June 28, 1966

3,258,616
PORTABLE THERMIONIC POWER SOURCE
William R. Martini, Northridge, Calif., assignor to
North American Aviation, Inc.
Filed Nov. 30, 1962, Ser. No. 241,228
15 Claims. (Cl. 310—4)

The present invention is directed to portable power supplies and more particularly to power sources involving the direct conversion of heat to electricity through the utilization of thermionic diode converters.

Portable power sources of the prior art generally utilize battery systems or large cumbersome engine-generators which have limited shelf-life or are of limited application as portable power sources. The present invention provides a lightweight, silent, long-shelf-life power source with great reliability, reduced logistical support requirements, and a voltage output of either D.C. or A.C. form.

Therefore, it is an object of the present invention to provide a lightweight thermionic power source for converting heat directly to electricity utilizing an improved diode heater and fuel temperature control.

It is another object of the present invention to provide a portable thermionic power source powered by conventional fuels which utilizes two thermionic converter diodes connected in electrical push-pull arrangement and utilizing separate fuel combustion chambers located internally of the diodes.

It is a further object of the present invention to provide a thermionic power source powered by fuel combustion, utilizing two thermionic diodes supplied from the same fuel and air source which are individually self controlling to provide a preselected voltage output wave form.

It is another object of the present invention to provide a portable thermionic power source utilizing a pair of thermionic diodes each containing a combustion chamber and regenerative heat exchanger.

It is a further object of the present invention to provide a portable power source utilizing a pair of thermionic converters heated by the combustion of conventional fuel which produces an alternating current output.

Figure 1:
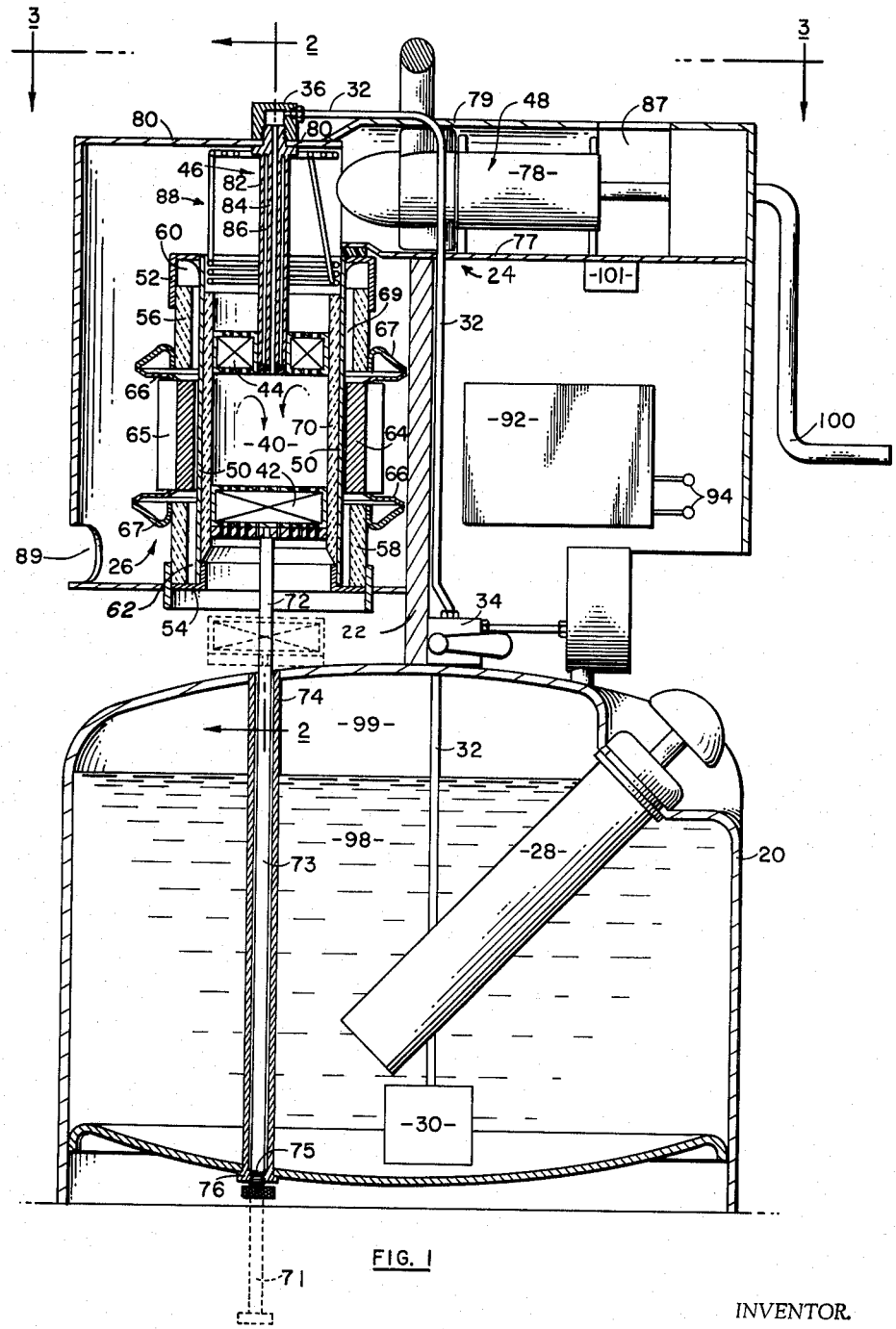
Figure 2:
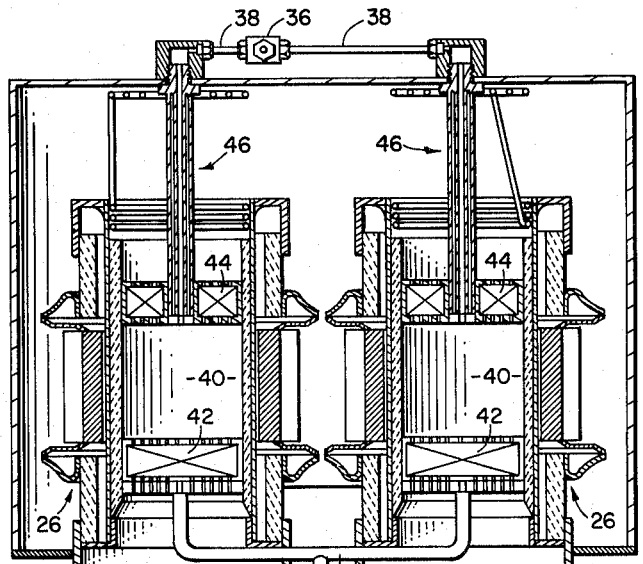
Figure 4:
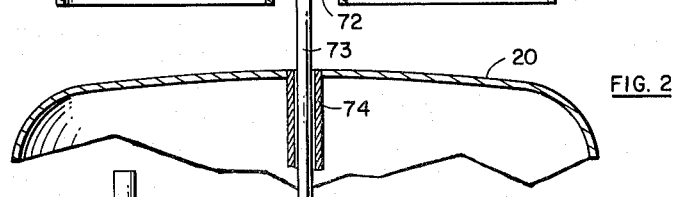
Figure 3:
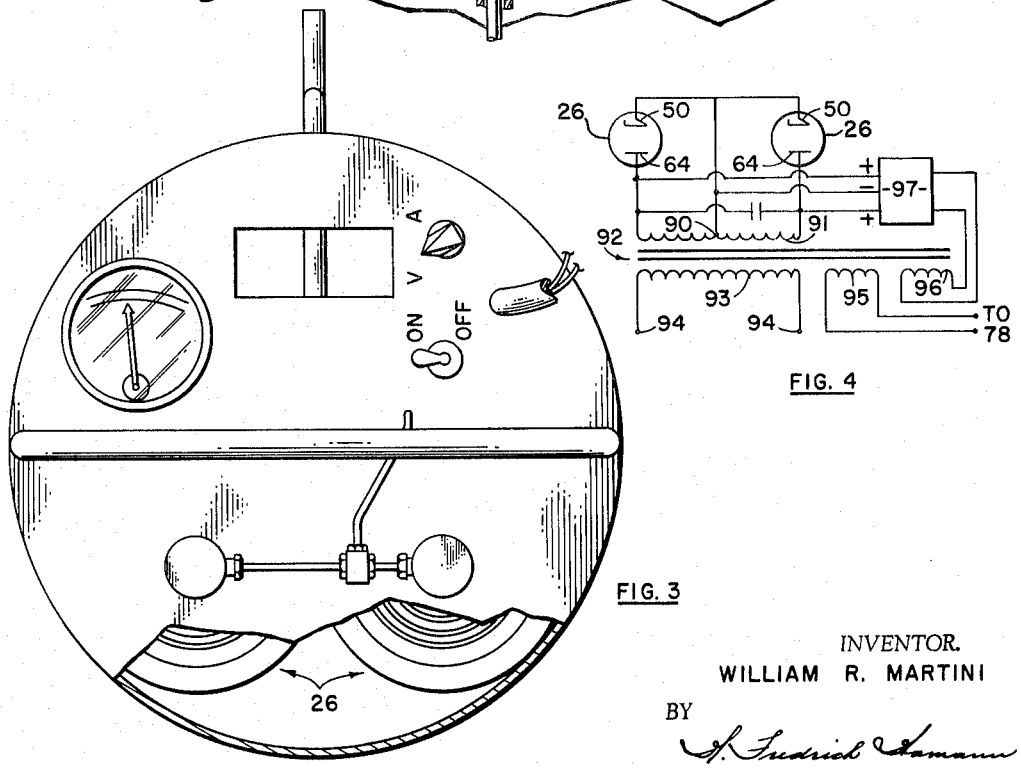

These and other objects and advantages of the present invention will be more apparent from the following description and drawings, made a part hereof, in which:

FIG. 1 is a partially sectioned view of the power source of the present invention;
FIG. 2 is a view taken along line 2—2 of FIG. 1;
FIG. 3 is a top view of the power source of FIG. 1; and
FIG. 4 is an electrical circuit utilized in the embodiment of FIG. 1.

Referring to the drawings in detail, FIG. 1 shows a partially sectioned side view of the preferred embodiment of the present invention and includes a fuel storage tank 20, to which frame 22 is securely attached. The frame 22 supports the fan housing 24 and a pair of thermionic diodes 26 (see FIG. 2). The storage tank 20 is of conventional construction and includes a pressurizing pump 28, a fuel filter 30 and fuel line 32 connected through the filter 30 to the lower portion of the tank 20. The fuel line 32 is connected through an air-fuel valve 34 to manifold 36 located at the top and between the two diodes 26. Individual fuel lines 38 (see FIG. 2) connect the manifold to the fuel injector lines 46 for each of the diodes 26.

The preferred embodiment of the present invention utilizes a pair of thermionic diodes which are identical in construction and operation. Therefore only one diode will be described in detail.

Each thermionic diode, indicated generally at 26, comprises a combustion chamber 40 centrally located within diode 26, a pair of regenerative heat exchangers 42 and 44, a fuel injector 46 and air flow reversing means 48. The diode consists of a cylindrical molybdenum cathode sleeve 50, a top and bottom closure plate, 52 and 54 respectively, and outer seal cylinders 56 and 58. The plates 52 and 54 are brazed to the respective ends of the cathode 50 and to the ends of cylinders 56 and 58 so that upper and lower annular chambers 60 and 62 respectively, are formed. The cylindrical anode 64 is disposed in closely spaced relation with the outer surface and at the approximate mid-point of the cathode 50. Cooling fins 65 are provided on the outer surface of anode 64 to promote radiation cooling. Anode 64 is supported by and sealed to flexible diaphragm members 66 of very thin sheet material which are in turn sealed to the outer periphery of metallic circular support elements 67. Electrically insulating cylindrical seals 56 and 58, preferably of aluminum oxide, are sealed to the inner surface of support elements 67 and are spaced from the cathode 50. In this manner the anode 64 is electrically insulated from cathode 50 and is flexibly supported adjacent thereto to provide for thermal expansion of the cathode without affecting the cathode-anode spacing. Further, the upper chamber 60, remotely located with respect to the combustion chamber 40, is utilized as a cesium reservoir. The chamber 60 communicates through the passage 69 defined by the cathode 50 and spaced seal 56 with the inter-electrode space between the outer surface of cathode 50 and the inner surface of anode 64 so that cesium vapor is present in the interelectrode space.

A heat shield sleeve 70, preferably of silicon carbide, extends over the major portion of the inner surface of cathode 50 and separates the cathode 50 from the combustion chamber 40. The lower and upper boundaries of the combustion chamber 40 are defined by regenerative heat exchangers 42 and 44 supported within the sleeve 70 and may consist of a packing of wire screen stacks, corrugated metal, or refractory material having numerous apertures for the passage of air. Both lower regenerators 42 are movably supported on yoke 72 which is connected to rod 73. The rod 73 is slidably supported within tube 74 which passes through and is sealed to tank 20. A threaded portion 75, rotatably connected to the bottom of rod 73, engages a flange 76 to hold the rod 73 and regenerators 42 in their upper position. Disengagement of the threaded portion 75 from flange 76 allows the rod 73 to move to the position 71 shown in FIG. 1. In this manner, the regenerators 42 may be lowered to allow the insertion of a match to ignite the fuel air mixture in combustion chamber 40. The upper end of the cathode 50 and plate 52 are supported on but electrically insulated from air duct 77 in which is mounted a motor 78 operatively connected to a fan 79. The duct 77 communicates through regenerators 44 to combustion chambers 40 and regenerator 42.

The fuel injector 46 is supported on the upper surface of bypass duct 80 and includes an outer tube 82 and a small diameter inner tube 84 which is connected to fuel line 38 and which is sealed to the outer pipe 82 at both ends so that a sealed chamber 86 is formed. The chamber 86 is filled with a coolant to maintain the fuel passing through tube 84 below the coking temperature. The duct 80 has one or more openings 89, which may have air flow restricting dampers, adjacent the lower portion of each diode 26 so that air may pass around the cooling fins 65 of the anodes 64 to maintain a temperature gradient between the cathode 50 and anode 64 of each diode. The reversible motor 78 is provided with a hand crank 100 to initiate the air circulation through the duct 77 and 80 and combustion chamber 40 from air inlet 87.

A separate heat exchanger shown generally as tube 88 is utilized for removing heat from the cesium reservoir volume in chamber 60 of each diode. The function and operation of this tube and the fluids utilized are more fully explained in the inventor's copending application S.N. 241,274, filed November 30, 1962, entitled, "Method and Apparatus for Controlling Temperature."

The two diodes utilized in the preferred embodiment may be connected in electrical series or parallel arrangement to provide a D.C. or A.C. voltage output. The preferred connection is shown in FIG. 4, in which the two diodes 26 are connected in push-pull electrical arrangement. The cathodes 50 are interconnected to the center tap 90 of the primary 91 of transformer 92 while the anodes 64 are connected to opposite sides of the primary 91. The secondary 93 is connected to the output terminals 94 and includes auxiliary windings 95 and 96. The auxiliary winding 95 may be included as a source of voltage for driving fan motor 78, while the auxiliary winding 96 may be utilized as a voltage source for electronic pulser 97. The pulser 97 is connected across the diode arrangement and operates to switch each diode from an ignited to an extinguished mode in accordance with the description of S.N. 223,765 filed September 14, 1962, entitled, "Thermionic Diode Converter System," by Hoff et al., the disclosure of which is incorporated herein by reference. Other electrical connections and arrangements will be apparent to those skilled in the art.

The portable thermionic power source described above has an output of 100 watts at 12 volts and stands 10 inches high with a 6-inch diameter. In operation the fuel, e.g., gasoline, is charged to the power source by unscrewing the pump 28, pouring fuel 98 into the tank, replacing the pump 28, and pumping to the proper pressure. Compressed air 99 forces the fuel through the filter 30, line 32 to valve 34. The valve may have two control levers projecting from opposite sides, one lever regulating fuel flow into line 32 and the other lever regulating air flow from compressed air source 99. In such an arrangement both compressed air 99 and fuel 98 are fed through line 32 to manifold 36 and fuel injectors 46, thereby providing a spray of fuel which may be easily ignited by a match. Upon shutdown, the compressed air 99 may be let out of the tank 20 so that all fuel is removed from the fuel line 32 and injectors 46, thereby preventing coking of the fuel.

Fuel is injected into the combustion chamber 40 through injector 46 which assures that the fuel vaporizes properly so that fuel vapor jets into the center of the chamber 40. This jet induces a recirculation-type flow as indicated in FIG. 1 to help the gases in the chamber thoroughly mix and to allow complete mixing and burning before the gases leave the chamber.

Air is forced through duct chamber 80 down through top regenerator 44 into the combustion chamber 40 by energizing the motor driven fan 79. Once the burning begins the bottom regenerator 42 heats up due to the hot exhaust gases passing through it and in this manner materially reduces the temperature of the exhaust gases and stores the heat in the regenerator 42. The regenerators 42 and 44 are made with very large surface-to-volume ratios and consequently with narrow flow passages. Air movement may be accomplished by a hand crank 100, or through use the of a motor once operation temperatures have been attained. After the burning and air flow process has proceeded for a predetermined length of time, i.e., 30 seconds, the motor 78 of fan 79 is automatically reversed by time switch 101. The time interval is selected so that the bottom of the regenerator 42 does not become too hot before flow reversal. Upon air flow reversal, the fuel injection is continued without interruption but, since the air is now being passed through the hot regenerator 42 prior to entry into the combustion chamber 40, it is preheated thereby materially improving the combustion process.

During this portion of the operating cycle, the exhaust gases are passing upwardly through regenerator 44 thereby heating it so that the temperature of the exhaust gases is reduced and heat stored. This portion of the flow cycle is maintained for a predetermined length of time, i.e., 30 seconds, and is again reversed. The periodic reversal is continued throughout operation thereby reducing heat losses and improving the combustion process. The heat cycle to which the tube 88 and fuel injector 46 are exposed by the alternate exposure to cool incoming air and hot exhaust gases maintains the cesium reservoir 60 and coolant in injector 46 between prescribed temperature limitations. The fluid in chamber 86 will be maintained by proper selection of volume to surface area at a temperature sufficiently high to preheat the incoming fuel but low enough to prevent fuel coking.

I claim:

1. A portable thermionic power supply comprising at least one thermionic converter diode, said diode having a cathode defining a combustion chamber and an anode spaced from said cathode and responsive to emission therefrom, means for injecting fuel into said chamber, means for pumping air through said combustion chamber so that air is passed into said combustion chamber and is mixed with said fuel and combustion products are passed from said combustion chamber, means for passing a portion of the air pumped over said anode, and means for periodically reversing the direction of said pumping means and air through said combustion chamber and over said anode, and means for extracting electrical current from said diode in response to heat generated in said combustion chamber.

2. The power supply of claim 1 wherein said means for injecting fuel includes a fuel tank, means for pressurizing said tank, and means for controlling the fuel flow from said tank; and including means on said tank for supporting said diode and air pumping means.

3. The power supply of claim 1 including two thermionic converter diodes.

4. The power supply of claim 1 wherein said diode includes a pair of regenerative heat exchangers located on opposite sides of said combustion chamber and in the path of the air pumped by said pumping means.

5. The power supply of claim 1 wherein a portion of said electrical current generated by said last-named means is connected to drive said pumping means.

6. The power supply of claim 1 including two thermionic converter diodes, means electrically connecting the output of said diodes to an output terminal, each of said diodes having at least a regenerative heat exchanger located adjacent said combustion chamber.

7. The power supply of claim 1 including two thermionic converter diodes, and means for connecting said diodes in electrical push-pull relationship.

8. The power supply of claim 1 wherein said air pumping means includes duct means connected to said fan, said duct means bypassing said combustion chamber and providing an air path exterior to said diode and in heat-exchanging relationship with said anode.

9. The power supply of claim 1 wherein said diode includes a plasma reservoir and including means for maintaining the temperature of said reservoir within predetermined temperature limits.

10. The power supply of claim 8 wherein said diode includes a plasma reservoir and including means for maintaining the temperature of said reservoir within predetermined temperature limits, at least a portion of said maintaining means being located in the path of air passing through said bypass duct means.

11. A portable thermionic power supply comprising a source of fuel; a plurality of thermionic converter diodes supported on said source, each diode having a cathode defining a combustion chamber; means for passing fuel from said source to each of said combustion chambers; means, including a duct supported on said source, for moving air into each of said combustion chambers and for removing combustion products therefrom; means for driving said air-introducing means in a preselected direction; means for periodically reversing said direction so that air is introduced into said combustion chamber from alternately opposite directions; and means located adjacent said combustion chamber for removing a portion of the heat from said combustion products leaving said chamber and preheating said air entering said chamber.

12. The power supply of claim 11 including means for moving said last-named means from a first position adjacent said combustion chamber to a second position remote from said chamber.

13. The power supply of claim 12 wherein said means for moving includes a rod longitudinally slidably supported within and sealed from said fuel source.

14. A portable thermionic power supply comprising at least one thermionic converter diode, said diode having a cathode defining a combustion chamber and an anode located on the outside of and spaced from said cathode, means for pumping air, duct means connected to said pumping means for passing air into said chamber and around said anode, means for periodically reversing said pump means to reverse the flow of air through said duct means and said chamber, and means for extracting electrical current from said diode.

15. The power supply of claim 14 including means adjacent said combustion chamber for extracting and storing heat from exhaust gases leaving said combustion chamber.

References Cited by the Examiner
UNITED STATES PATENTS

| | | | |
|---|---|---|---|
| 483,752 | 10/1892 | Warnwright | 165—4 |
| 2,362,259 | 11/1944 | Findley | 322—2 |
| 2,881,384 | 4/1959 | Durant | 322—2 |

MILTON O. HIRSHFIELD, *Primary Examiner.*

LLOYD McCOLLUM, *Examiner.*

A. TISCHER, J. J. SWARTZ, *Assistant Examiners.*